(12) United States Patent
Deruelle et al.

(10) Patent No.: US 8,332,871 B2
(45) Date of Patent: Dec. 11, 2012

(54) MECHANISM FOR IMPROVED INTEGRATION OF JSLEE AND SIP SERVLETS IN A JAVA VIRTUAL MACHINE

(75) Inventors: Jean Deruelle, Dechy (FR); Ivelin Atanasoff Ivanov, Austin, TX (US); Eduardo Martins, Sesimbra (PT)

(73) Assignee: Red Hat, Inc., Raleigh, NC (US)

( * ) Notice: Subject to any disclaimer, the term of this patent is extended or adjusted under 35 U.S.C. 154(b) by 945 days.

(21) Appl. No.: 12/395,389

(22) Filed: Feb. 27, 2009

(65) Prior Publication Data

US 2010/0223626 A1    Sep. 2, 2010

(51) Int. Cl.
*G06F 9/44*     (2006.01)
*G06F 15/173*   (2006.01)

(52) U.S. Cl. ........................ 719/318; 709/223
(58) Field of Classification Search .................. 719/318
See application file for complete search history.

(56) References Cited

U.S. PATENT DOCUMENTS

| | | | | |
|---|---|---|---|---|
| 6,557,046 B1* | 4/2003 | McCauley et al. | ............ | 719/318 |
| 7,072,957 B2* | 7/2006 | Creamer et al. | ............ | 709/223 |
| 7,596,523 B2* | 9/2009 | Sobel et al. | ............ | 705/36 R |
| 7,788,109 B2* | 8/2010 | Jakobson et al. | ............ | 705/1.1 |
| 8,230,449 B2* | 7/2012 | Maes | ............ | 719/328 |
| 2002/0108102 A1* | 8/2002 | Muhlestein et al. | ............ | 717/124 |
| 2004/0040033 A1* | 2/2004 | Smith et al. | ............ | 719/330 |
| 2007/0124006 A1* | 5/2007 | Tucker et al. | ............ | 700/90 |
| 2009/0217299 A1* | 8/2009 | Belluati et al. | ............ | 719/318 |

OTHER PUBLICATIONS

Phelim O'Doherty, "JSLEE-SIP Servlet"; Sun Microsystem, 2003, 13 pages.*

* cited by examiner

*Primary Examiner* — Andy Ho
*Assistant Examiner* — Abdou Seye
(74) *Attorney, Agent, or Firm* — Lowenstein Sandler PC

(57) ABSTRACT

In one embodiment, a mechanism for improved integration of JSLEE and SIP Servlets in a JAVA virtual machine is disclosed. In one embodiment, a method includes sending an event received at a Session Initiation Protocol (SIP) Servlet to a Java™ APIs for Intelligent Networks Service Logic Execution Environment (JSLEE) container through a fireEvent method, wherein the SIP Servlet and the JSLEE container are integrated in a same JAVA virtual machine (JVM). The method further includes receiving at the SIP Servlet an object that includes a getResult method, processing by a JSLEE application in the JSLEE container the event to produce a result, returning by the JSLEE application the result through a setResult method, and obtaining by the SIP Servlet the result via the getResult method.

20 Claims, 5 Drawing Sheets

MECHANISM FOR IMPROVED INTEGRATION OF JSLEE AND SIP SERVLETS IN A JAVA VIRTUAL MACHINE

TECHNICAL FIELD

The embodiments of the invention relate generally to communication platforms and, more specifically, relate to improved integration of JSLEE and SIP Servlets in a JAVA Virtual Machine.

BACKGROUND

Voice over Internet Protocol (VoIP) has seen a rise in popularity in recent times and has become more than just a telephony application. For instance, several highly popular applications have come into existence like Skype™, Google Talk™, and MSN Messenger™. All of these applications combine voice, instant messaging (IM), and other modes of communication into unified clients and greatly enhance the user experience. Previously, these means to communicate were islands—largely isolated from each other. However, engineers visited them and found large areas of community between these different modes of communication, resulting in integrated clients that have changed the way in which communication and business is conducted.

For integrated communication applications, such as those described above, server support needs to be provided. An examination of the structure of such communications applications indicates that there are two parts to the application: the signaling part and the media part. The signaling part is an event-oriented activity. Network endpoints exchange one-way messages through various servers and signal the establishment of a session. Interesting services can be built by placing fragments of code, or "event handlers," in the signaling path at the server. Furthermore, service providers may speed up their innovation processes and quickly launch new services if they use a standards-based component model and container architecture.

One standards-based application execution framework is JAIN SLEE or JSLEE. JAIN is an acronym for "Java APIs for Intelligent Networks." JAIN aims for an enabling set of Java APIs to develop and deploy service-driven network applications. SLEE is an acronym for "service logic execution environment." Together, JAIN SLEE (or JSLEE) is an application execution framework analogous to the Java™ Enterprise Edition (JAVA EE) environment. However, in comparison to JAVA EE, JSLEE's design principles explicitly aim for a low latency (<100 ms) and high throughput (thousands of events per second) environment optimized for asynchronous event processing, including transaction handling, high reliability, a distributed component model, and a standardized framework. Appropriately, JSLEE was designed for a network signaling environment, which is ideal for a communications platform.

Another protocol developed for signaling is Session Initiation Protocol (SIP). This important signaling protocol for the telecommunications industry is rapidly moving to next-generation applications. Java™ is an excellent platform for SIP development, especially on the server side. Similar to JSLEE, SIP servlets are a container-based specification. SIP servlets were designed to simplify SIP development by building container functionality on top of a SIP stack for programming convenience. SIP servlets integrate a SIP stack into the container to talk to the SIP network, which can be viewed as a library built upon a SIP stack hiding complexity from the application developer. In addition, SIP servlets are built upon the servlet concept, with the service logic coded in the SIP servlet, for a common programmatic feel.

JSLEE and SIP Servlets each address unique requirements for communications applications that are not addressed by the execution environment of JAVA EE. Currently, integration of JSLEE and SIP Servlets in a single Java™ Virtual Machine has been accomplished. However, a problem with the present integration of JSLEE and SIP Servlets is the complexity required to integrate the two specifications. In order for a SIP Servlet application to communicate with a JSLEE container, an additional layer, such as an EJB (Enterprise JavaBean) layer, is added to the SIP Servlet application to enable this communication. The addition of this layer means that the SIP Servlet application now must be deployed on a JAVA EE-compliant application server, rather than just a SIP Servlet-compliant server, which adds further complexity. In addition, with the current JSLEE API, there is no way for the SIP Servlet application to get a result back from the JSLEE container in a simple manner, as the present communication mechanism is an asynchronous or "fire and forget" mechanism.

As a result, a way to remove the additional layer of complexity in the interoperable JSLEE/SIP Servlets applications, as well as for SIP Servlet applications to fire events into JSLEE and control the return of that result, would be beneficial.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Figure 1:
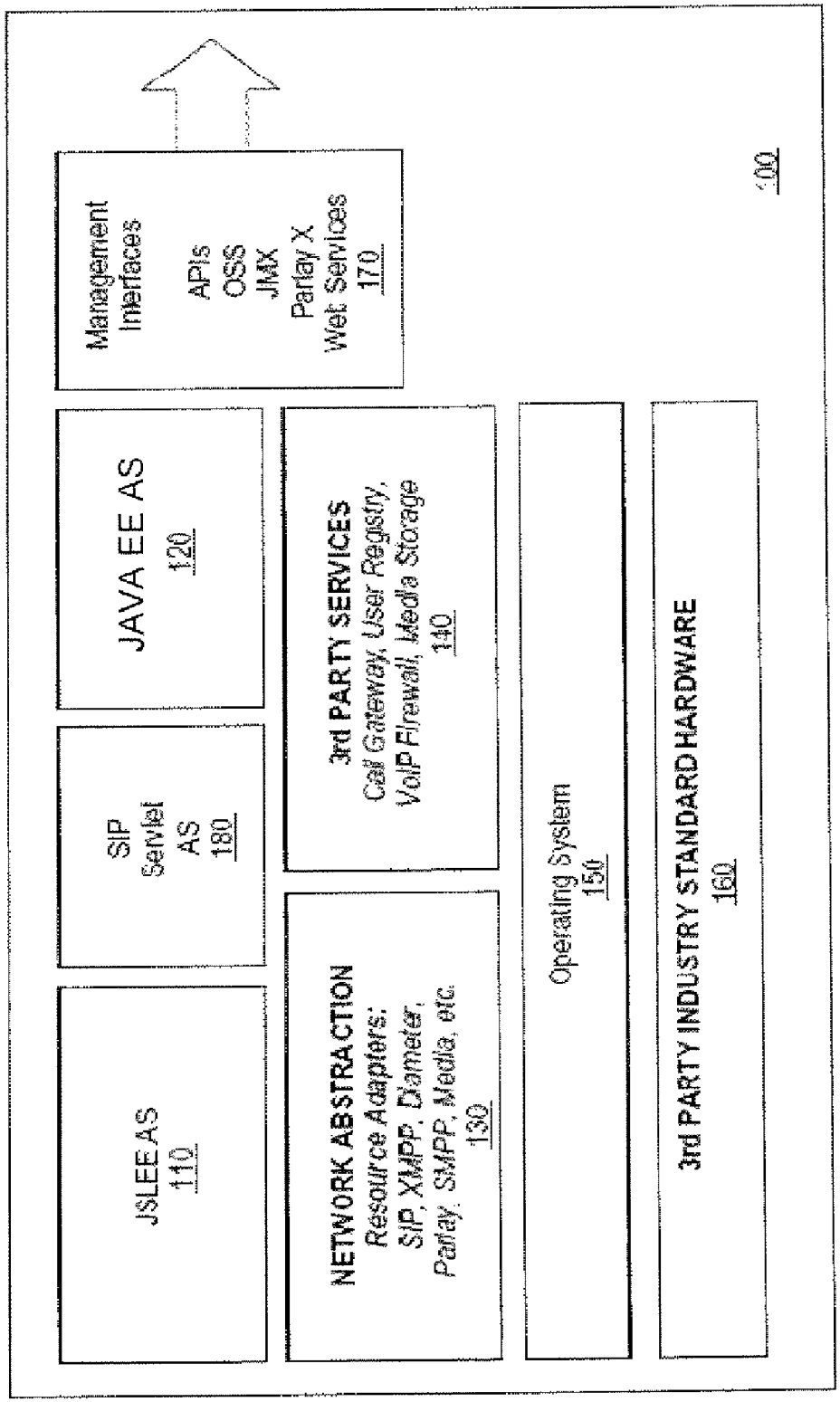
FIG. 1 is a block diagram of a communications platform that integrates JSLEE and SIP Servlets as an extension of JAVA EE and is capable of performing embodiments of the invention.

Embodiments of the invention provide a mechanism for improved integration of Java™ APIs for Intelligent Networks Service Logic Execution Environment (JSLEE) and Session Initiation Protocol (SIP) Servlets in a Java™ virtual machine (JVM). In one embodiment, a method of improved integration of JSLEE and SIP Servlets in a JVM includes sending an event received at a SIP Servlet to a JSLEE container through a fireEvent method, wherein the SIP Servlet and the JSLEE container are integrated in a same JAVA virtual machine (JVM). The method further includes receiving at the SIP Servlet an object that includes a getResult method, processing by a JSLEE application in the JSLEE container the event to produce a result, returning by the JSLEE application the result through a setResult method, and obtaining by the SIP Servlet the result via the getResult method.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (non-propagating electrical, optical, or acoustical signals), etc.

Embodiments of the invention provide a mechanism for improved integration of JSLEE and SIP Servlets in a JVM. Embodiments of the invention provide for improved integration of JSLEE and SIP Servlets in a JVM by removing an extra layer of complexity from the SIP Servlet architecture that was previously utilized for communication with JSLEE. In addition, a new method is added to the SLEE connection of the JSLEE specification and a new abstract class containing three methods is added to the JSLEE specification. These additions enable the controlled firing of events between a SIP Servlet application and a JSLEE application, with the ability for the SIP Servlet to obtain the result by blocking or polling for it.

FIG. 1 is a block diagram depicting a communications platform 100 that integrates JSLEE and SIP Servlets with JAVA EE. Communications platform 100 is a single JVM. A JVM is a set of computer software programs and data structures that use a virtual machine model for the execution of other computer programs and servers. Communications platform 100 enables the creation, deployment, and management of services and applications that integrate voice, video, and data. It also functions seamlessly across a range of Internet Protocol (IP) and communications networks, and can be accessed by computers, handsets, and other network-enabled devices.

Communications platform 100 includes an integrated JSLEE Application Server (AS) 110, a SIP Servlet AS 180, and a JAVA EE AS 120. The integrated JSLEE, SIP Servlet, and JAVA EE application servers combine JSLEE and SIP Servlet specifications with JAVA EE to enable the development, deployment and management of applications that integrated of voice, video and data across a range of networks and devices.

JSLEE is the JAVA EE for communications, as it is event driven, high throughput, and low latency. On the other hand, SIP Servlets bridge the gap between communications and enterprise systems. SIP Servlets enables web applications to interface with communications networks and devices. SIP Servlets provide a simple programming model by providing a server-side interface describing a container of SIP components or services, to make development of SIP services simple.

The integrated JSLEE 110, SIP Servlets 180, and JAVA EE 120 application servers are a single integrated stack, with JSLEE, SIP Servlets, and JAVA EE running in the same JVM 100. As illustrated, the hierarchy of components supporting the integrated JSLEE AS 110, SIP servlet AS 180, and JAVA EE AS 120 components include a JSLEE network abstraction component 130, third party services 140, operating system 150, and third party industry standard hardware 160. Also depicted in FIG. 1 are JSLEE APIs 170 to interface with other outside applications. In one embodiment, the JAVA EE component 110 may be a JBOSS™ application server distributed by Red Hat, Inc. of Raleigh, N.C. In another embodiment, the operating system may be Red Hat™ Enterprise Linux system.

In one embodiment, network abstraction component 130 provides a network abstraction layer for the communications platform 100. The network abstraction layer provides connectivity between applications of the communications platform 100 and any network environment, including an IP network or a Legacy network. In this way, application logic is network protocol agnostic so that the application developer is insulated from the underlying network protocol, and thereby simplifies porting between networks. The network abstraction is achieved by the external resources via Resource Adapters (RAs). For example, RAs may include, but are not limited to, Session Initiation Protocol (SIP), Extensible Messaging and Presence Protocol (XMPP), GoogleTalk, Asterisk, Parlay, Diameter, Media, Real-Time Transport Protocol (RTP), Short Message Peer-to-Peer Protocol (SMPP), Intelligent Network Application Part (INAP), HyperText Transport Protocol (HTTP), and Production Rules.

In one embodiment, management interfaces 170 provide third party application programming interfaces (APIs). These third party APIs simplify integrating with core business systems. For example, some of the management functions provided by management interfaces 170 may include, but are not limited to, full visibility for monitoring and management via JMX, internal system APIs (Event Router, Activities, Time Facility), RA APIs, and application APIs (service usage, service building blocks usage, event traffic control). Third party APIs also provide Operational/Business Support Systems (OSS/BSS) connectivity.

In one embodiment, the use of the modular JAVA EE architecture with JSLEE and SIP Servlets results in a simple and cleanly separable architecture for the implementation of embodiments of the invention. When utilizing a JAVA EE applicatoin server that implements microkernel services, such as the JBoss™ application server, each management interface mandated by the JSLEE and SIP Servlets are installed as a logically separate microkernel service of the JAVA EE. Such a JAVA EE microkernel architecture allows JSLEE and SIP Servlets to work with a minimal set of installed JAVA EE services, thus making for an integrated, extensible, and modular architecture.

Figure 2:
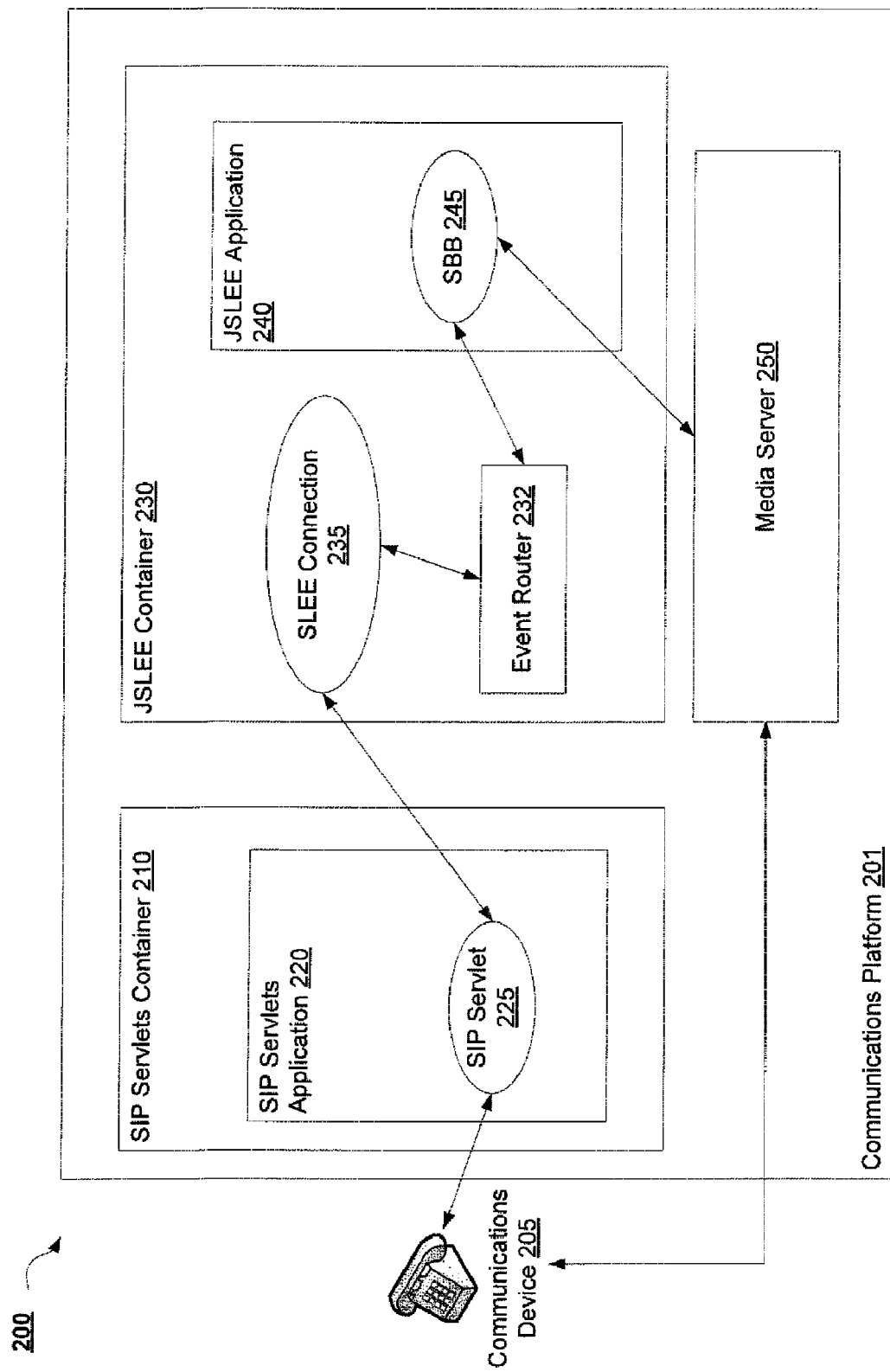
FIG. 2 is a block diagram of a communications platform with improved integration of JSLEE and SIP Servlet applications according to an embodiment of the invention.

FIG. 2 is a block diagram illustrating a communications system 200 with improved integration of JSLEE and SIP Servlet applications according to an embodiment of the invention. In one embodiment, communications system 200 includes a communications platform 201 communicably coupled to a communications device 205. In one embodiment, communication platform 201 is the same as communications platform 100 of FIG. 1. In some embodiments, communications device 205 may include a telephone (as depicted), a fax device, a cell phone, a Global Positioning System (GPS) device, a computer, a modem, and/or any other device capable of sending communication signals. Communications device 205 may be communicably coupled to communications platform 201 directly or indirectly via a network. In one embodiment, communications platform 201 includes a communications port (not shown) to receive signals directly or indirectly (e.g., via a network) from communications device 205.

In some embodiments, communications platform 201 may be implemented on a single computer or multiple computers. In other embodiments, communications platform 201 may be implemented on one or more servers. Communications platform 201 includes a SIP Servlets container 210, a JSLEE container 230, and a media server 250. SIP Servlets container 210 may include one or more SIP Servlets applications 220 that implement one or more SIP Servlets 225. JSLEE container 230 includes an event router 232, a SLEE connection 235, and one or more JSLEE applications 240. JSLEE application 240 further includes one or more service building blocks (SBB) 245. SIP Servlets container 210 and JSLEE container 230 are integrated in a single JVM within communications platform 201. Furthermore, media server 250 may be communicably coupled to SIP Servlets container 210 and JSLEE container 230 to initiate media related to events processed by SIP Servlets container 210 and JSLEE container 230. In one embodiment, these events may correspond to communication signals sent from communications device 205.

SIP Servlets 210 and JSLEE 230 are both standards defined through the JAVA Community Process that address the development of applications. Both standards define a container based model for applications, define how applications may be built and deployed in the respective containers and the services and features supplied by the containers. SIP Servlets 210 defines a container-based model that is an extension of the well understood Servlet model. It was designed to simplify the development of SIP based applications and thereby enhance the adoption of the SIP protocol. JSLEE 230 defines an application environment suited for network orientated applications. It defines a protocol agnostic, component and object orientated and transacted programming model.

SIP Servlet container 210 and JSLEE container 230 enable their interoperability via the one or more SIP Servlets 225 and SLEE connection 235. SLEE connection 235 is interface into a physical event-delivery connection to JSLEE 230. This interface may be used by components external to JSLEE 230 to communicate with JSLEE's event routing subsystem. SLEE connection 235 communicates with event router 232 in order to send the event router 232 incoming events. In turn, the event router 232 routes the events to the appropriate SBB 245 to handle for processing.

Prior art techniques to integrate the SIP Servlets 210 and JSLEE 230 required the addition of another layer into the SIP Servlet container 210, such as an Enterprise JavaBean (EJB) component layer, in order to fire events to JSLEE in a stateful manner. However, as mentioned before, this added layer in SIP Servlets 210 creates additional complexity in the architecture by requiring the SIP Servlet application 220 to be implemented on a JAVA EE-compliant server, rather than a SIP Servlet-compliant server, to ensure support of the added layer.

Embodiments of the invention eliminate the added layer of complexity in the integrated SIP Servlet/JSLEE architecture of prior art techniques by adding a new method to the SLEE connection 235 of the JSLEE specification, and by adding a new abstract class holding three methods to the JSLEE application programming interface (API). The signature of the new method added to the SLEE connection 235 is as follows: Future<V> fireEvent (org.mobicents.slee.Event event, EventTypeID eventType, ExternalActivityHandle handle, Address address). The new abstract class is the class Event, which holds three methods: void setResult (Object object), Object getResult( ), and Object getResult(long timeout, TimeUnit unit). Embodiments of the invention may utilize the new method and new class to provide both synchronous and asynchronous event processing in the integrated SIP Servlet/JSLEE architecture without adding any additional layers of complexity to the architecture, as detailed below in FIGS. 3 and 4.

Figure 3:
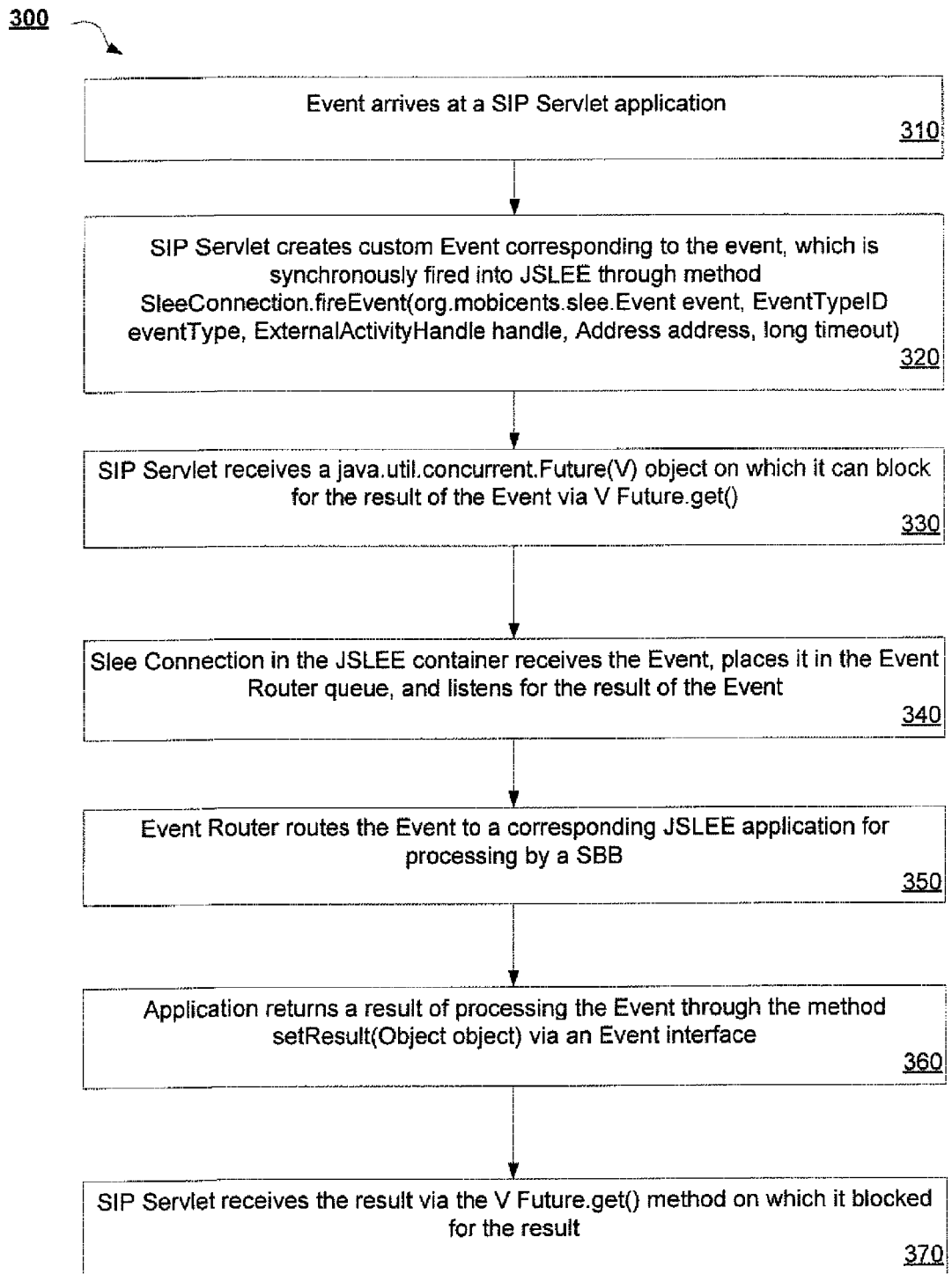
FIG. 3 is a flow diagram illustrating synchronous integration of SIP Servlets and JSLEE in a single JVM according to an embodiment of the invention.

FIG. 3 is a flow diagram illustrating a method 300 for synchronous integration of SIP Servlets and JSLEE in a single JVM according to an embodiment of the invention. Method 300 may be performed by processing logic that may comprise hardware (e.g., circuitry, dedicated logic, programmable logic, microcode, etc.), software (such as instructions run on a processing device), or a combination thereof. In one embodiment, method 300 is performed by communications platform 201 of FIG. 2.

Method 300 begins at block 310 where an event arrives at a SIP Servlet container and its corresponding SIP Servlet application. At block 320, a SIP Servlet of the SIP Servlet application creates a custom Event corresponding to the event, which it synchronously fires into JSLEE through the method SleeConnection.fireEvent (org.mobicents.slee.Event event, EventTypeID eventType, ExternalActivityHandle handle, Address address, long timeout). At block 330 the SIP Servlet receives a java.util.concurrent.Future(V) object on which it can block for the result (V Future.get( )) of the fired Event.

Then, at block 340, a SLEE connection in the JSLEE container receives the fired Event, places it in an Event Router queue, and listens for the result of the Event. At block 350, the event router routes the Event to a corresponding JSLEE application for processing by a SBB of the JSLEE application. When the application is done processing the Event, it returns the result of the processing through the method setResult (Object object) of the Event interface at block 360. Lastly, at block 370, the SIP Servlet receives the result via the V Future.get( ) method on which it previously blocked for the result.

As described above, method 300 provides a way for an integrated SIP Servlet application and JSLEE application to interoperate without an additional layer of complexity being added to the SIP Servlet application, while also allowing the SIP Servlet application to obtain the result of any events it has fired into the JSLEE application in a synchronous manner.

Figure 4:
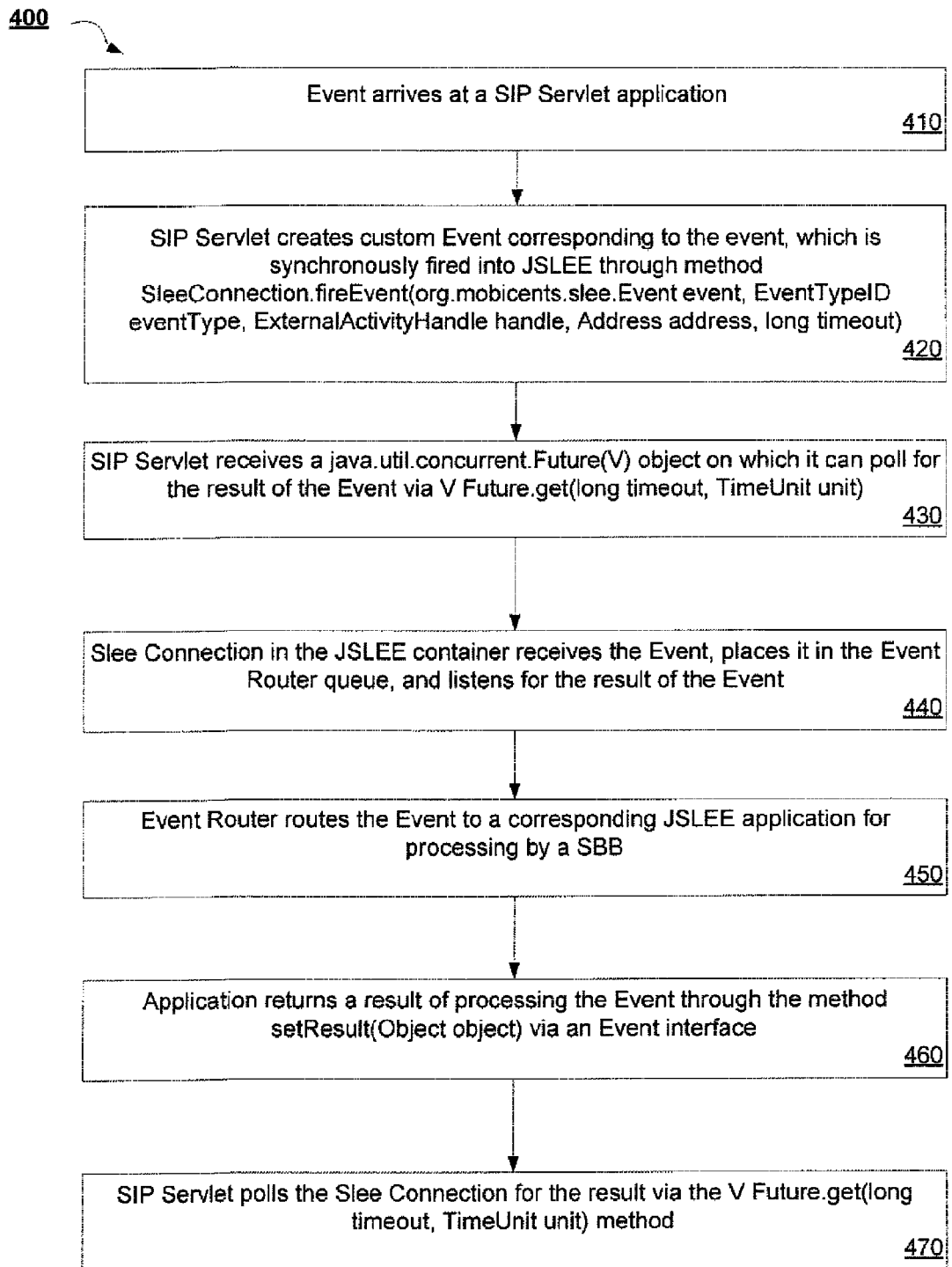
FIG. 4 is a flow diagram illustrating asynchronous integration of SIP Servlets and JSLEE in a single JVM according to an embodiment of the invention.

FIG. 4 is a flow diagram illustrating a method 400 for asynchronous integration of SIP Servlets and JSLEE in a single JVM according to an embodiment of the invention. Method 400 may be performed by processing logic that may comprise hardware (e.g., circuitry, dedicated logic, programmable logic, microcode, etc.), software (such as instructions run on a processing device), or a combination thereof. In one embodiment, method 400 is performed by communications platform 201 of FIG. 2.

Method 400 begins at block 410 where an event arrives at a SIP Servlet container and its corresponding SIP Servlet application. At block 420, a SIP Servlet of the SIP Servlet application creates a custom Event corresponding to the event, which it asynchronously fires into JSLEE through the method SleeConnection.fireEvent (org.mobicents.slee.Event event, EventTypeID eventType, ExternalActivityHandle handle, Address address, long timeout). At block 430 the SIP Servlet receives a java.util.concurrent.Future(V) object on which it can poll in order to obtain the result of the event via method V Future.get(long timeout, TimeUnit unit).

Then, at block 440, a SLEE connection in the JSLEE container receives the fired Event, places it in the Event Router queue, and listens for the result of the Event. At block 450, the event router routes the Event to a corresponding JSLEE application for processing by a SBB of the JSLEE application. When the application is done processing the Event, it returns a result of the processing through the method setResult(Object object) of the Event interface at block 460. Lastly, at block 470, the SIP Servlet application polls the SLEE connection for the results through the method Future.get(long timeout, TimeUnit unit).

As described above, method 400 provides a way for an integrated SIP Servlet application and JSLEE application to interoperate without an additional layer of complexity being added to the SIP Servlet application. Method 400 also allows the SIP Servlet application to obtain the result of any events it has fired into the JSLEE application in an asynchronous manner by polling the JSLEE application for the result.

Figure 5:
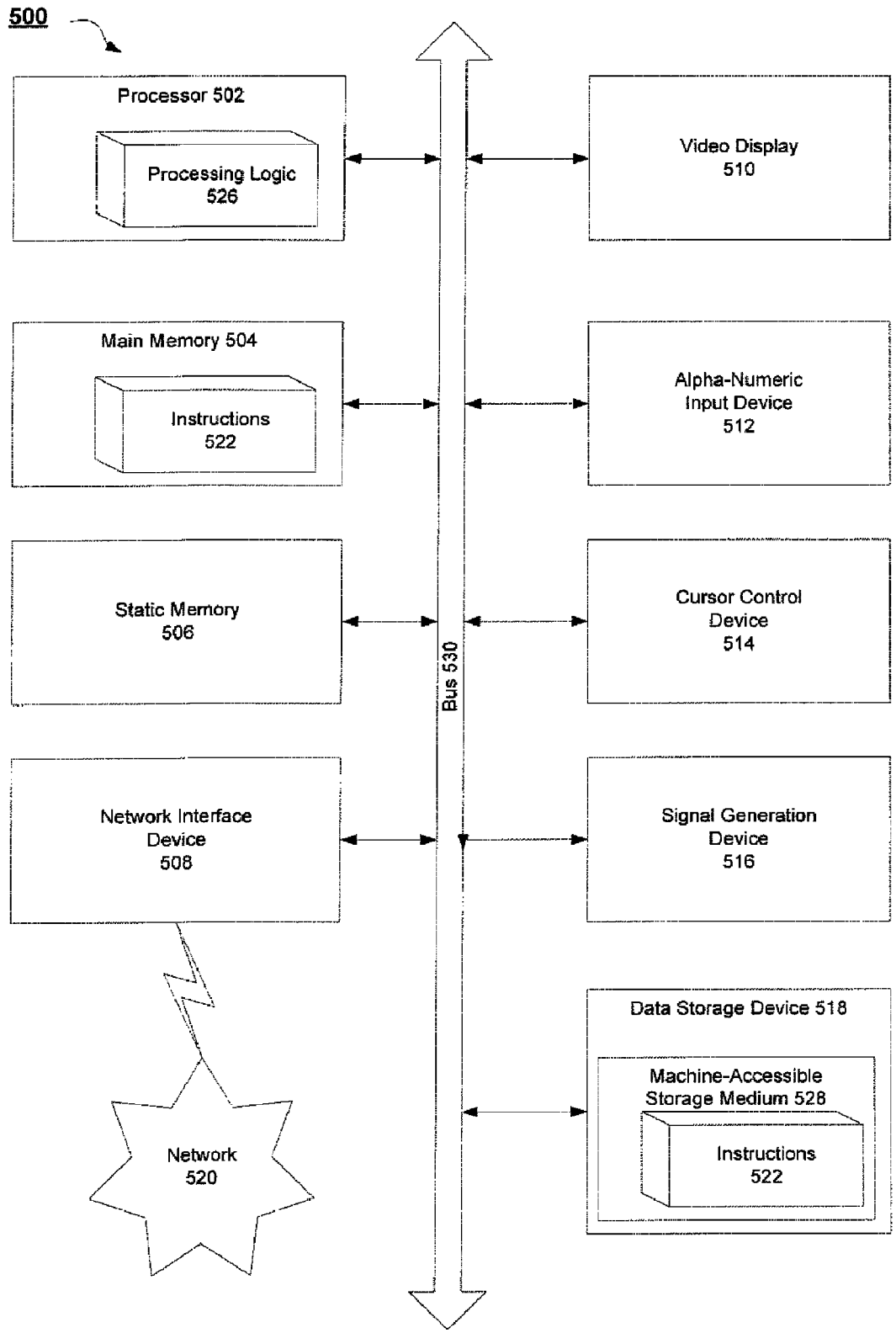
FIG. 5 illustrates a block diagram of one embodiment of a computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an internet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) (such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 528 on which is stored one or more set of instructions (e.g., software 522) embodying any one or more of the methodologies of functions described herein. The software 522 may also reside, completely or at least partially, within the main memory 504 and/or within the processing device 502 during execution thereof by the computer system 500; the main memory 504 and the processing device 502 also constituting machine-accessible storage media. The software 522 may further be transmitted or received over a network 520 via the network interface device 508.

The machine-readable storage medium 528 may also be used to stored instructions to perform improved integration of SIP Servlets and JSLEE in a single JVM described with respect to FIGS. 3 and 4, and/or a software library containing methods that call the above applications. While the machine-accessible storage medium 528 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A computer-implemented method, comprising:
   sending, by a processing device, an event received at a Session Initiation Protocol (SIP) Servlet container to a Java™ APIs for Intelligent Networks Service Logic Execution Environment (JSLEE) container through a fireEvent method, wherein the SIP Servlet container and the JSLEE container are integrated in a same JAVA virtual machine (JVM);
   receiving, at the SIP Servlet container, an object that includes a getResult method;
   processing, by a JSLEE application in the JSLEE container, the event to produce a result;
   returning, by the JSLEE application, the result through a setResult method; and
   obtaining, by the SIP Servlet container, the result via the getResult method,
   wherein the getResult method and the setResult methods are members of a class Event that provides both synchronous and asynchronous event processing by the JVM without adding a component layer to the SIP Servlet container to send events to the JSLEE container while maintaining state of the SIP Servlet container.

2. The method of claim 1, further comprising:
   placing, by a SLEE connection of the JSLEE container, the event in a queue of an event router of the JSLEE container;
   routing, by the event router, the event to the JSLEE application for processing by a Service Building Block (SBB) of the JSLEE application.

3. The method of claim 1, wherein the fireEvent method is part of a SLEE connection interface of the JSLEE container and comprises a signature of SleeConnection.fireEvent.

4. The method of claim 1, wherein the object received at the SIP Servlet container allows the SIP Servlet container to block for the result via the getResult method.

5. The method of claim 1, wherein the object received at the SIP Servlet container allows the SIP Servlet container to poll for the result via the getResult method.

6. The method of claim 5, wherein the getResult method utilized for polling comprises a signature of getResult.

7. The method of claim 1, wherein the setResult and getResult methods are part of a class Event that is included in an application programming interface (API) of the JSLEE container.

8. The method of claim 1, wherein the JSLEE container and the SIP Servlet container share a common microkernel architecture.

9. A system, comprising:
   a memory;
   a processing device communicably coupled to the memory;
   a communications port communicably coupled to the memory and the processing device, the communications port configured to receive an event from a communications device;
   a media server executable from the memory by the processing device, the media server configured to initiate media related to the event; and
   an integrated application server executable from the memory by the processing device and communicably coupled to the communications port and the media server, the integrated application server configured to integrate Java™ APIs for Intelligent Networks Service Logic Execution Environment (JSLEE) container, Session Initiation Protocol (SIP) Servlets container, and Java™ Enterprise Edition (JAVA EE) container and configured to:
   receive the event at the SIP Servlet container;
     send the event from the SIP Servlet container to the JSLEE container through a fireEvent method;
   receive an object at the SIP Servlet container that includes a getResult;
     process the event at a JSLEE application of the JSLEE container to produce a result;
   return the result from the JSLEE application through a setResult method; and
   obtain the result at the SIP Servlet container via the getResult method;
   wherein the getResult method and the setResult methods are members of a class Event that provides both synchronous and asynchronous event processing by the JVM without adding a component layer to the SIP Servlet container to send events to the JSLEE container while maintaining state of the SIP Servlet container.

10. The system of claim 9, wherein the integrated application server further to:
    place, by a SLEE connection of the JSLEE container, the event in a queue of an event router of the JSLEE container; and
    route the event via the event router to the JSLEE application for processing by a Service Building Block (SBB) of the JSLEE application.

11. The system of claim 9, wherein the fireEvent method is part of a SLEE connection interface of the JSLEE container and comprises a signature of SleeConnection.fireEvent.

12. The system of claim 9, wherein the object received at the SIP Servlet container allows the SIP Servlet container to block for the result via the getResult method.

13. The system of claim 9, wherein the object received at the SIP Servlet container allows the SIP Servlet container to poll for the result via the getResult method.

14. The system of claim 13, wherein the getResult method utilized for polling comprises a signature of getResult.

15. The system of claim 9, wherein the setResult and getResult methods are part of a class Event that is included in an application programming interface (API) of the JSLEE container.

16. A non-transitory machine-readable storage medium including data that, when accessed by a machine, cause the machine to perform operations comprising:

Sending, by a processing device, an event received at a Session Initiation Protocol (SIP) Servlet container to a Java™ APIs for Intelligent Networks Service Logic Execution Environment (JSLEE) container through a fireEvent method, wherein the SIP Servlet container and the JSLEE container are integrated in a same JAVA virtual machine (JVM);

receiving, at the SIP Servlet container, an object that includes a getResult;

processing, by a JSLEE application in the JSLEE container, the event to produce a result;

returning, by the JSLEE application, the result through a setResult method; and obtaining, by the SIP Servlet container, the result via the getResult method;

wherein the getResult method and the setResult methods are members of a class Event that provides both synchronous and asynchronous event processing by the JVM without adding a component layer to the SIP Servlet container to send events to the JSLEE container while maintaining state of the SIP Servlet container.

17. The non-transitory machine-readable storage medium of claim 16, wherein the machine-readable storage medium further includes date that, when accessed by the machine, cause the machine to perform further operations comprising:

placing, by a SLEE connection of the JSLEE container, the event in a queue of an event router of the JSLEE container;

routing, by the event router, the event to the JSLEE application for processing by a Service Building Block (SBB) of the JSLEE application.

18. The non-transitory machine-readable storage medium of claim 16, wherein:

the fireEvent method is part of a SLEE connection interface of the JSLEE container and comprises a signature of SleeConnection.fireEvent; and the setResult and getResult methods are part of a class Event that is included in the JSLEE application programming interface (API).

19. The non-transitory machine-readable storage medium of claim 16, wherein the object received at the SIP Servlet container allows the SIP Servlet container to block for the result via the getResult method.

20. The non-transitory machine-readable storage medium of claim 19, wherein the object received at the SIP Servlet container allows the SIP Servlet container to poll for the result via the getResult method that comprises a signature of getResult.

* * * * *